(12) United States Patent
Menard et al.

(10) Patent No.: US 9,696,691 B2
(45) Date of Patent: Jul. 4, 2017

(54) ACCESS KEY FOR A MOTOR VEHICLE WITH NEAR-FIELD COMMUNICATION EXCHANGE CAPABILITY

(75) Inventors: Eric Menard, Creteil (FR); Eric Leconte, Creteil (FR)

(73) Assignee: VALEO SECURITE HABITACLE, Créteil (FR)

( * ) Notice: Subject to any disclaimer, the term of this patent is extended or adjusted under 35 U.S.C. 154(b) by 611 days.

(21) Appl. No.: 13/642,968

(22) PCT Filed: Apr. 21, 2011

(86) PCT No.: PCT/EP2011/056405
§ 371 (c)(1),
(2), (4) Date: Mar. 5, 2013

(87) PCT Pub. No.: WO2011/131750
PCT Pub. Date: Oct. 27, 2011

(65) Prior Publication Data
US 2013/0154794 A1 Jun. 20, 2013

(30) Foreign Application Priority Data
Apr. 23, 2010 (FR) ...................... 10 01761

(51) Int. Cl.
*G05B 1/01* (2006.01)
*G07C 9/00* (2006.01)

(52) U.S. Cl.
CPC ........... *G05B 1/01* (2013.01); *G07C 9/00944* (2013.01)

(58) Field of Classification Search
CPC .............................. G05B 1/01; G07C 9/00944

USPC ................................................ 340/5.72, 5.61
See application file for complete search history.

(56) References Cited

U.S. PATENT DOCUMENTS

| 5,600,539 | A | * | 2/1997 | Heys et al. | 361/679.32 |
| 6,125,036 | A | * | 9/2000 | Kang | H01L 23/4006 165/80.4 |
| 6,147,604 | A | * | 11/2000 | Wiklof et al. | 340/572.1 |
| 8,196,604 | B1 | * | 6/2012 | Ricciardi | A61L 9/14 137/601.11 |

(Continued)

FOREIGN PATENT DOCUMENTS

DE 10 2008 004111 A1 7/2009

OTHER PUBLICATIONS

International Search Report w/translation issued in PCT/EP2011/056405 mailed Sep. 19, 2011 (4 pages).

*Primary Examiner* — Yong Hang Jiang
(74) *Attorney, Agent, or Firm* — Osha Liang LLP

(57) ABSTRACT

The invention relates to an access key (1) for unlocking a motor vehicle, comprising: —a communication interface (112) configured so as to communicate according to an NFC protocol; —a support containing data constituting service provision rights; —a monitoring circuit (111) able to process a transaction by way of said communication interface (112) on the basis of said data constituting the service provision rights; characterized in that it comprises a housing (106) for receiving a support containing data constituting service provision rights of removable type (2), and in that it comprises a read and/or write interface (113) in the removable support placed in the housing, the monitoring circuit (111) being configured so as to allow an exchange of data between the communication interface and the read/write interface.

9 Claims, 2 Drawing Sheets

(56) References Cited

U.S. PATENT DOCUMENTS

| | | | | |
|---|---|---|---|---|
| 2004/0145450 A1* | 7/2004 | Katagiri | ............. | G07C 9/00944 340/5.72 |
| 2004/0201512 A1* | 10/2004 | Sugimoto et al. | ............ | 341/176 |
| 2005/0136852 A1* | 6/2005 | Nakagawa | .............. | B60R 25/24 455/90.3 |
| 2006/0219776 A1 | 10/2006 | Finn | | |
| 2006/0279413 A1* | 12/2006 | Yeager | ....................... | 340/10.51 |

* cited by examiner

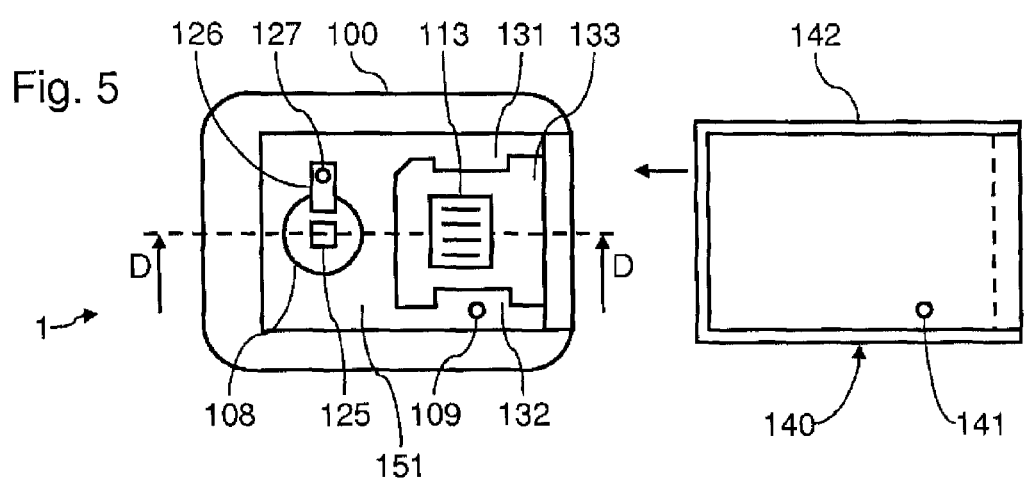
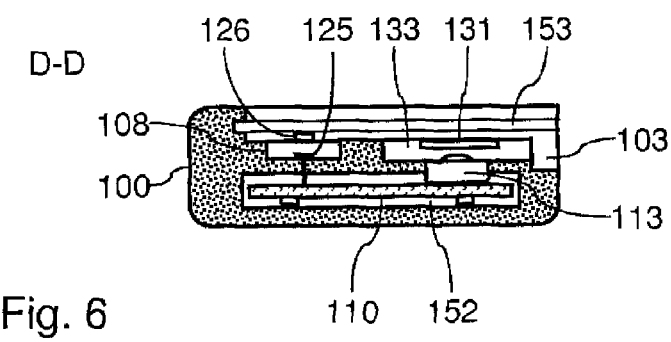

ACCESS KEY FOR A MOTOR VEHICLE WITH NEAR-FIELD COMMUNICATION EXCHANGE CAPABILITY

The invention relates to unlocking keys for accessing and/or authorizing the starting of a motor vehicle, and in particular keys allowing the unlocking of the vehicle to be carried out by pressing a button of the key, through two-way exchange in the form of query-response with the vehicle or through simple bringing close of a reader of the vehicle and near-field query-response exchange or NFC with the reader of the vehicle.

The invention also relates to the use of such keys for near-field communication in an application in addition to the unlocking or the authorization of starting. Near-field communication (NFC) uses a data exchange protocol based on very short-range radio frequencies. This involves an extension of radio identification techniques which, on the basis of the ISO/IEC 14443 standard, allow communication between peripherals in peer-to-peer mode. The NFC protocol is based on an inductive coupling and a charge modulation in a slave device.

Unlike other radio identification or Bluetooth techniques which have a range of around ten meters, the NFC technique is usable over very short distances of a few centimeters. It presupposes a deliberate action on the part of the user and cannot therefore normally be used without his knowledge, thereby providing a guarantee of security for sensitive transactions such as a banking operation or the unlocking of a vehicle.

NFC technology is currently developed by an industrial consortium combined under the name of Forum NFC. NFC technology is derived from RFID (Radio Frequency Identification) technology and uses NFC components or processors presenting a plurality of operating modes, notably a reader mode and a card emulation mode.

In reader mode, an NFC processor operates as a conventional RFID reader to gain read or write access to an RFID chip. The NFC processor transmits a magnetic field, sends data through modulation of the amplitude of the magnetic field and receives data through charge modulation and inductive coupling. This mode is also referred to as active mode, because the NFC processor transmits a magnetic field in this mode.

In emulation mode, an NFC processor operates passively in the manner of a transponder to communicate with another reader and be seen by the other reader as an RFID chip. The processor does not transmit a magnetic field, receives data by demodulating a magnetic field transmitted by the other reader and transmits data by modulating the impedance of its antenna circuit (charge modulation). This mode is also referred to as passive mode, because the NFC processor does not transmit a magnetic field in this mode.

Other modes of communication can be implemented, notably a "device" mode wherein a component must pair up with another NFC processor in the same operating mode, each NFC processor setting itself alternately to a passive state (without field emission) to receive data and to an active state (with field emission) to transmit data.

In these three operating modes, an NFC processor can implement a plurality of contactless communication protocols, for example ISO 14443-A, ISO 14443-B or ISO 15693. Each protocol defines a transmission frequency of the magnetic field, a method for modulating the amplitude of the magnetic field to transmit data in active mode, and a method for charge modulation through inductive coupling to transmit data in passive mode.

A certain number of standards define the NFC protocol:
NFCIP-1 (ISO/IEC 18092) defines the interface and the communication protocol between two NFC peripherals;
ISO/IEC 14443-1 to ISO/IEC 14443-4 define communication with contactless integrated circuits;
NDEF (NFC Data Exchange Format) defines the logical data exchange format.

NFC communication generally presents the following characteristics:
Communication speeds: 106, 212, 424 or 848 kbit/s;
Frequency range: 13.56 MHz;
Communication distance: around 10 cm;
Communication mode: half-duplex or full-duplex;

The document entitled "Schlüsselerlebnis" ["*Key experience*"], published on 16 Apr. 2010 by Tobias Schöllermann and Thomas Kratz on the Internet at www.elektroniknet.de proposes the integration of new functionalities into a vehicle unlocking key provided with an NFC communication interface. The proposed key integrates an electronic circuit having access to the NFC communication interface. This electronic circuit has a memory allowing it to store a certain number of elements of information supplied by the vehicle during its use, for example the date of the next service, the date of the next technical inspection of the vehicle, the remaining fuel quantity, the location of the vehicle or its operating state. This information can thus be usefully consulted even when the user has left the vehicle. The electronic circuit supplies a certain number of other applications to the key. The key is notably used to authenticate the user and store electronic travel tickets, store loyalty points, make a purchase payment or record rights to use different vehicles. The electronic circuit of the key can notably allow reservations to be made by authenticating the user from a telecommunication system integrated into the vehicle.

The electronic key control circuit is encapsulated within a sealed protection enclosure. As well as protecting the electronic circuit against external aggressions, an enclosure of this type and the integration of the electronic circuit also avoid a manipulation of the latter by a dishonest user wishing to make fraudulent use thereof without the knowledge of the owner.

However, a key of this type has a number of disadvantages in practice. If a vehicle is resold, the vehicle access keys are transferred to the new owner. The electronic circuit present in the key potentially stores particularly sensitive personal data relating to the user. The electronic circuit notably stores secret encryption keys, such as banking data or a certain number of personal data which it is desirable not to supply to the new owner. When the vehicle is handed over, it is therefore indispensable for the former owner to re-initialize the secret key(s) by visiting his dealer, or to generate new secret keys. This operation may entail a long and tedious process, and may not offer a sufficient guarantee of erasure for the former owner. Furthermore, a massive use of such a vehicle key for a fleet of rental vehicles proves to be impossible in practice. In fact, the re-initialization or renewal of a secret key with each change of user would be tedious and would render the use of such a vehicle key inoperative, the data collected by the electronic circuit for a user becoming unusable without laborious manipulations during the recovery of the vehicle.

The invention aims to overcome one or more of these disadvantages by means of an unlocking key (1) for accessing a motor vehicle, comprising:
a communication interface (112) configured to communicate according to an NFC protocol;

a medium containing data constituting service provision rights;

a control circuit (111) suitable for processing a transaction via said communication interface (112) on the basis of said data constituting service provision rights;

characterized in that it comprises a housing (106) to receive a medium containing data constituting service provision rights of a removable type (2), and in that it comprises a read and/or write interface (113) in the removable medium placed in the housing, the control circuit (111) being configured to allow an exchange of data between the communication interface and the read/write interface.

Other characteristics and advantages of the invention will become clearly evident from the description given below, in an indicative and non-limiting manner, with reference to the attached drawings, in which:

FIG. 5 is a top view of a key according to a third embodiment, of which the battery housing is open;

FIG. 6 is a side view in cross section of the key shown in FIG. 5.

The invention proposes an unlocking key for accessing a motor vehicle. Such a key, also referred to by the term "electronic identification element", has an antenna and a control circuit of the key to perform an unlocking transaction with a vehicle, known per se. The key has a housing to receive a removable medium containing data and a read/write interface in such a medium present in the housing. The key furthermore comprises an NFC communication interface connected to the read/write interface to allow an exchange of data between the NFC communication interface and the read/write interface.

Thus, the key allows the implementation of a large number of different applications without having to be concerned with the re-initialization of the key in the event of its transfer. A user can keep his personal data when he changes vehicles and has guarantees that his personal data will not be kept by a third party when he transfers the key to said party without the removable medium.

Figure 1:
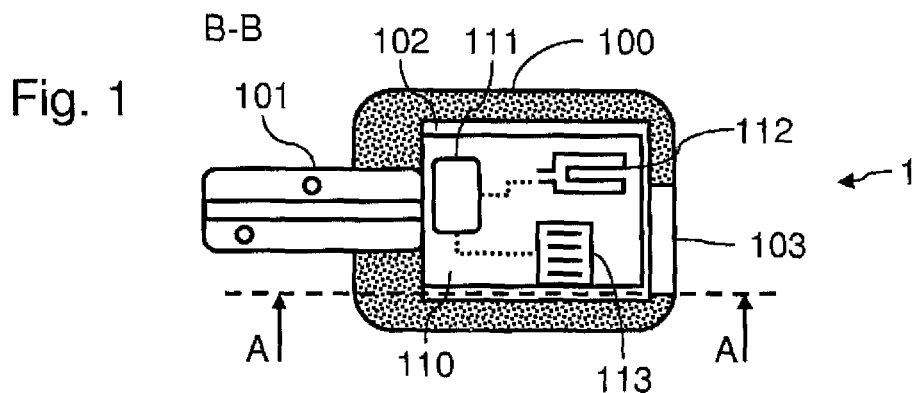
FIG. 1 is a top view in cross section of a first embodiment of a key according to the invention.
Figure 2:
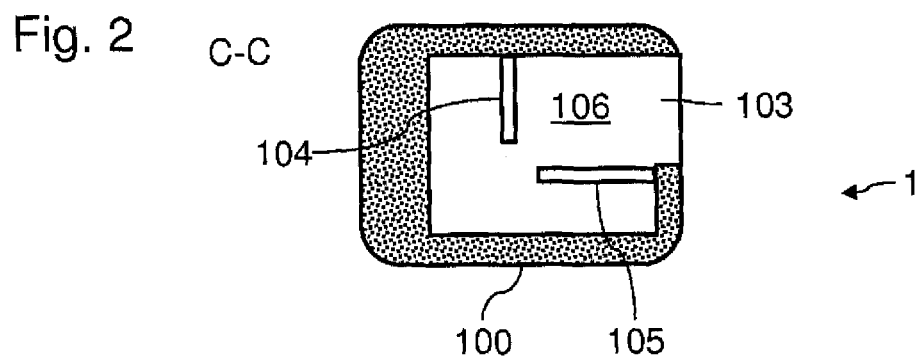
FIG. 2 is a bottom view in cross section of the key shown in FIG. 1.
Figure 3:
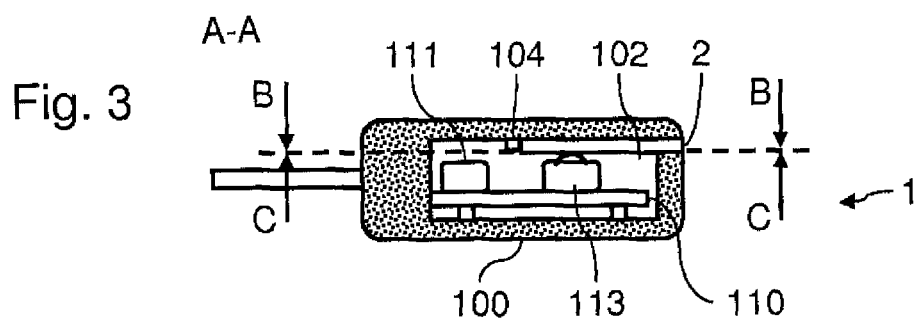
FIG. 3 is a front view in cross section of the key shown in FIG. 1.

FIGS. 1 to 3 show cross section views of a first embodiment of a key 1 according to the invention. The key 1 comprises a casing 100 in which a cavity 102 is disposed. The cavity 102 is disposed between two half-casings fitted together. A mechanical key 101 forms a protuberance in relation to the casing 100. The mechanical key 101 has a unique unlocking pattern associated with a lock of the vehicle. The cavity 102 houses a substrate 110 in a manner known per se intended to receive electronic components and comprising electrical pathways connecting them. An antenna 112, possibly associated with an excitation circuit, both known per se, is housed in the cavity 102. The antenna 112 is, for example, fixed onto the substrate 110. The antenna 112 and its excitation circuit form a, for example radiofrequency, communication interface configured to communicate according to an NFC protocol.

A control circuit ill, implemented, for example, in the form of a microcontroller, is fixed onto the substrate 111. The control circuit 111 is connected to the antenna 112 in such a way as to be able to communicate according to the NFC protocol. The control circuit 111 comprises a memory containing access and/or starting authentication data of the key, based on a unique identifier of the key. The control circuit 111 is suitable for receiving an authentication request and responding to it via a second antenna, not shown but known per se, in such a way as to perform an unlocking and/or starting authorization transaction with a vehicle. The control circuit 111 can perform such a transaction in a manner known per se on the basis of authentication data contained in its memory.

In a manner known per se, the key 1 thus forms an electronic identifier of the user, allowing his authentication to enable the unlocking of the openers of the vehicle, access to the passenger compartment of the vehicle and de-activation of an ignition lock system. Once he has accessed the passenger compartment of the vehicle, the user can, in one embodiment, notably place the key 1 in a slot of a reader mounted in the vehicle, typically disposed in the dashboard and communicating with the key through low-frequency exchange. The insertion of the key 1 into this slot enables the de-activation of the ignition lock of the vehicle. The starting of the engine may, for example, be initiated by pressing a button disposed on the dashboard.

The locking of the vehicle can be carried out automatically when the user moves away from the vehicle, by pressing a button of the key 1, causing the transmission of a locking command to a receiver of the vehicle typically using radio frequencies or through two-way exchange with the key following a locking command, for example through manual contact with a specific area of a vehicle door handle. The unlocking of the vehicle can of course also be carried out in this way by means of the mechanical key 101.

A read/write interface 113 is fixed onto the substrate 110. The read/write interface 113 is connected electrically to the control circuit 111. The read/write interface 113 is disposed in line with a housing 106 for receiving a removable medium. The housing 106 is disposed within the cavity 102. A removable medium 2 placed in the housing 106 is shown only in FIG. 3. The interface 113 has contact studs projecting into the housing 106 to come into contact with corresponding surface contacts of the removable medium 2.

The control circuit 111 is configured to allow an exchange of data between the antenna 112 and the interface 113. Thus, a transaction can be performed between an external terminal equipped with an NFC interface and the removable medium 2 storing appropriate data. The transaction may notably comprise the reading of information in the removable medium 2, and/or the updating or reading of information in the medium 2. In one embodiment, the removable data medium 2 is configured to manage the authorizations to access the data which this medium 2 itself contains, for example in the form of an access requiring the input and verification by the removable medium itself of a user PIN—Personal Identification Number—code.

A certain number of transactions with an associated terminal can thus be performed via the key 1, according to the properties of the medium 2. The transaction via the NFC protocol with the medium 2 is, for example, an update in the memory of the medium 2, upwards or downwards, of the loyalty points in the event of a purchase, a storing of the operating parameters of the vehicle during its use, a fixing or decrementation of an authorized fuel provision right, a storing or the consumption of travel tickets or entrance tickets to a services installation, a storing or the use of an access right to a building, an e-wallet transaction, i.e. the reloading or consumption of a monetary value stored locally in the key or the use of a secret banking key for a banking transaction. In this last case, and in a manner known per se, the writing in the removable medium consists in the writing of a random digit supplied by a remote server and transmitted here to the key via NFC, and the reading in a reading of a result obtained by applying a secret key stored in the removable medium and implemented using an algorithm stored and run in the removable medium itself.

More generally, the removable medium therefore contains data corresponding to rights to a service, for example a payment service, and these data are, for example, a secret key resulting in authentication vis-à-vis an entity providing the service, or an amount in the form of a numerical value corresponding to a certain authorized quantity of such a service.

The transaction therefore advantageously consists in the exercise or modification of these service rights through the use of the data stored in the removable medium. This right may be implemented by way of a secret banking key giving access to the debit of a remote bank account, or this right may be an amount stored locally in the removable medium, for example in the case of the exercise of loyalty points. This right may also be implemented by way of an amount indicating a fuel quantity which may be drawn over a given period, in the case of a company vehicle.

In one particular embodiment, the vehicle unlocking key comprises a reception slot for a removable medium which is a bank card in calling card format, the bank card then projecting beyond the unlocking key when it is positioned in the slot.

In the case of use of an electric vehicle, such an unlocking key is brought close to an electrical recharging terminal in order to carry out an NFC exchange between the key and the terminal. In this exchange, a payment is made using the bank card, and a right to a certain quantity of electrical energy is stored on the key. In this embodiment, the right to a certain quantity of electrical energy is stored in a fixed memory of the key in such a way that the key is then used to obtain a certain quantity of electricity from the terminal via an NFC link, without the need to keep the bank card in place in the unlocking key.

In this case, a removable medium in the form of a bank card for a payment transaction is used, resulting in a transaction entailing the reloading of rights to a quantity of energy, this time in a fixed memory of the key, the reloading alternatively being in an additional removable medium of the key such as a memory card with a low level of security.

According to the degree of security required by the transaction, the medium 2 is a simple EEPROM medium used in read/write mode or a chip card integrating a cryptosystem intended to link the transaction to a prior authentication. The applications permitted by the medium may be made possible or removed during the life cycle of the medium, for example by storing or removing software applications, or simply by storing a numerical value in a protected memory area, said area being dedicated in advance to a particular type of service, such as e-wallet, fuel quantity, loyalty points, etc.

The access of a medium 2 to the housing 106 is provided by an opening 103 disposed in a surface of the casing 100. A lateral stop 105 forms a guide rail guiding the medium 2 in a sliding manner during its insertion via the opening 103. The peripheral surfaces of the opening 103 also allow the medium 2 to be guided in a sliding manner. An axial stop 104 limits the sliding run of the medium 2 during its insertion. A flap (not shown) can be mounted on the casing in such a way as to selectively block the opening 103 and allow a protection against dust and humidity to be maintained inside the cavity 102.

The housing 106 may be designed to receive a chip card or microprocessor card 2, notably according to the ISO 7816 standard, integrating encryption and authentication functions. The housing 106 is advantageously designed to house a card in SIM—Subscriber Identification Module—or microSIM format. The interface 113 will then be able to have connection studs disposed in accordance with the ISO 7816-2 standard. The housing 106 may also be designed to receive a removable medium, notably in formats commercially distributed under the names SD, Compact Flash, Memory Stick, xD, MMC or PCMCIA. Memory cards of this type have surface contacts to communicate via contact studs of the interface 113.

Although a mechanical key 101 has been illustrated, the invention also applies to a non-mechanical key. The mechanical key 101 shown is fixed in relation to the casing 100. However, a key 1 provided with a retractable mechanical key 101 in the casing 100 can of course be implemented. In a manner known per se, the casing 100 may have an external surface shaped to facilitate gripping by the user.

Figure 4:
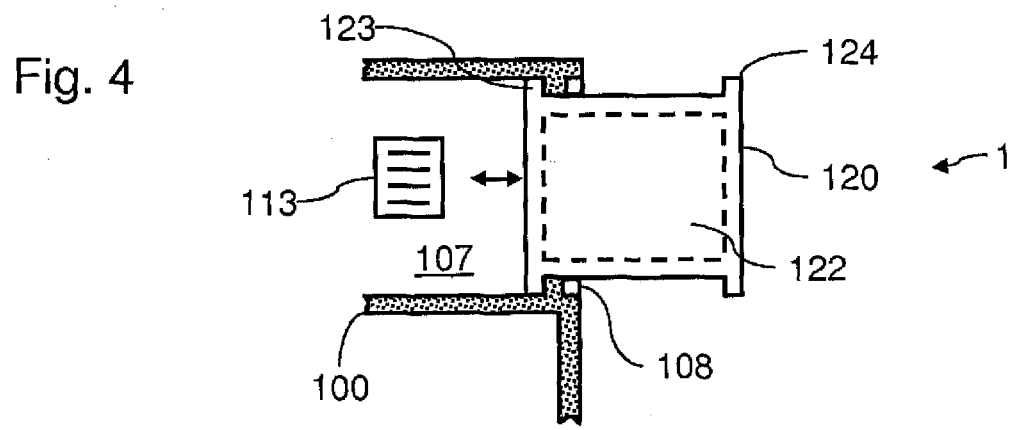
FIG. 4 is a top view in cross section of a housing of a key according to a second embodiment.

FIG. 4 is a top view in cross section of an embodiment of a key 1 according to the invention. In this embodiment, a drawer 120 is mounted in a sliding manner in a groove 107 disposed inside the casing 100. The drawer 120 has stops 123 allowing its maximum opening position to be defined. The stops 123 also allow the drawer 120 to be guided in a sliding manner in the groove 107. The drawer 120 has a cavity 122 intended to receive the removable medium 2. The cavity 122 thus forms a housing being able to be disposed outside the casing 100 to facilitate the insertion of the medium 2. When the drawer 120 is slid towards the inside of the casing 100, the surface contacts of the medium disposed in the cavity 122 come into contact with the contact studs of the interface 113. In order to improve the seal within the casing 100, the drawer 120 has projections 124 which become lodged in reinforcements 128 of the casing 103. The projections 124 and the reinforcements 128 may be configured to allow the end of the drawer 120 to be flush with the casing 100 in the closed position.

FIGS. 5 and 6 show a third embodiment of a key 1 according to the invention. In this embodiment, a sealed enclosure 152 is disposed inside the casing 100. The sealed enclosure 152 contains the substrate 110, the control circuit (not shown), the antenna (not shown) and the read/write interface 113. The sealed enclosure 152 may be obtained through the formation of a contiguous peripheral wall through molding. The sealed enclosure 152 may thus define a dry area, protecting the control circuit 111 and the substrate 110 against external aggressions, notably against humidity or dust.

A cavity 151 disposed in the casing 100 is formed in a separate manner in relation to the sealed enclosure 152. A receptacle 108 is formed in the cavity 151 to receive a power supply battery. The receptacle 108 has an electrical contact 125 in its base wall. A different electrical contact 126 is mounted in a pivoting manner via an axle 127 in line with the receptacle 108 to allow the insertion of a battery into the receptacle 108. The electrical contacts 125 and 126 are intended to come into contact with poles of an accumulator or battery placed in the receptacle 108 to provide the power supply of the electronic circuits contained in the enclosure 152.

A housing 133 to receive a removable medium is also formed in the cavity 151. An opening 103 disposed in a surface of the casing 100 allows the insertion of a removable medium into the housing 133. The interface 113 is disposed in line with the housing 133. The contact studs of the interface 113 project into this housing 133. The seal around the interface 113 is provided by any means appropriate for ensuring that the enclosure 152 remains sealed in relation to the cavity 151. The housing 133 is overhung by stubs 131 and 132, allowing the removable medium 2 to be guided in a sliding manner during its insertion, and also its retention in position.

The key 1 also has a removable case 140. The removable case 140 is configured to selectively provide access to the cavity 151 or to isolate this cavity from the outside. The case 140 is, for example, removed in order to change the battery or to extract or insert a removable medium in the housing 133. The case 140 advantageously has a lip 142 which can slide in a groove 153 disposed in the casing 100. The case 140 can thus slide in relation to the casing 100 as far as a position in which it blocks the access to the cavity 151. The case 140 may be kept in the closed position by means of a screw crossing an opening 141 of the case 140 and screwed into a threaded bore 109 disposed in a wall of the casing 100.

The case 140 and/or the casing 100 can be provided with a sealing gasket to guarantee the seal of the cavity 151 when the case 140 is in the closed position. The gasket may, for example, be molded onto or adhered to the case 140.

Although an interface 113 providing a link by contact with the removable medium has been described, it can also be envisaged that the key is suitable for communicating with the removable medium via a contactless communication interface. The key 1 and its NFC antenna can then be used as an amplifier for the requests sent to the removable medium or the responses returned by the removable medium.

The invention claimed is:

1. An unlocking key for accessing a motor vehicle, comprising:
    a communication interface configured to communicate according to an NFC protocol;
    a medium comprising data constituting service provision rights;
    a control circuit for processing a transaction via said communication interface on the basis of said service provision rights;
    a housing to receive the medium comprising data constituting service provision rights, wherein the medium is removable;
    a read and/or write interface in the removable medium placed In the housing, the control circuit being configured to allow an exchange of data between the communication interface and the read/write interface; and
    a casing housing the control circuit and the housing,
    wherein a sealed enclosure is disposed inside the casing, the sealed enclosure containing the control circuit,
    wherein the sealed enclosure contains the read and/or write interface,
    wherein contact studs of the read and/or write interface project into the housing to seal the sealed enclosure from humidity and dust.

2. The unlocking key as claimed in claim 1, wherein the housing is separated from the sealed enclosure containing the control circuit, the casing comprising a removable case configured to selectively provide access to said housing or to isolate said housing from the outside.

3. The unlocking key as claimed in claim 1, wherein a receptable configured to receive a battery is disposed in said housing, the key comprising two electrical contact studs configured to come into contact with two poles of a battery disposed in the receptacle, said electrical contact studs being electrically connected to said control circuit.

4. The unlocking key as claimed in claim 1, wherein the housing is disposed in a drawer mounted in a sliding manner in relation to the casing, so as to be able to selectively place the housing outside the casing.

5. The unlocking key as claimed in claim 1, wherein the read/write interface comprises an electrical connection connecting the contact studs to the control circuit.

6. The unlocking key as claimed in claim 1, wherein said housing comprises at least one guide rail configured to guide a removable medium in a sliding manner inside the housing.

7. The unlocking key as claimed in claim 1, wherein the removable medium is a microprocessor card.

8. The unlocking key as claimed in claim 7, wherein the removable medium is a microprocessor card in SIM card format.

9. The unlocking key as claimed in claim 1, wherein the housing of the removable medium comprises a slot to receive a payment card in calling card format.

* * * * *